Oct. 5, 1965  J. KARMAZIN  3,209,440
METHOD OF BONDING HEAT EXCHANGER HAVING
NESTED CONDUIT SECTIONS
Filed May 1, 1961  2 Sheets-Sheet 1

INVENTOR.
John Karmazin
BY
Harness, Dickey & Pierce
ATTORNEYS

Oct. 5, 1965    J. KARMAZIN    3,209,440
METHOD OF BONDING HEAT EXCHANGER HAVING
NESTED CONDUIT SECTIONS
Filed May 1, 1961    2 Sheets-Sheet 2
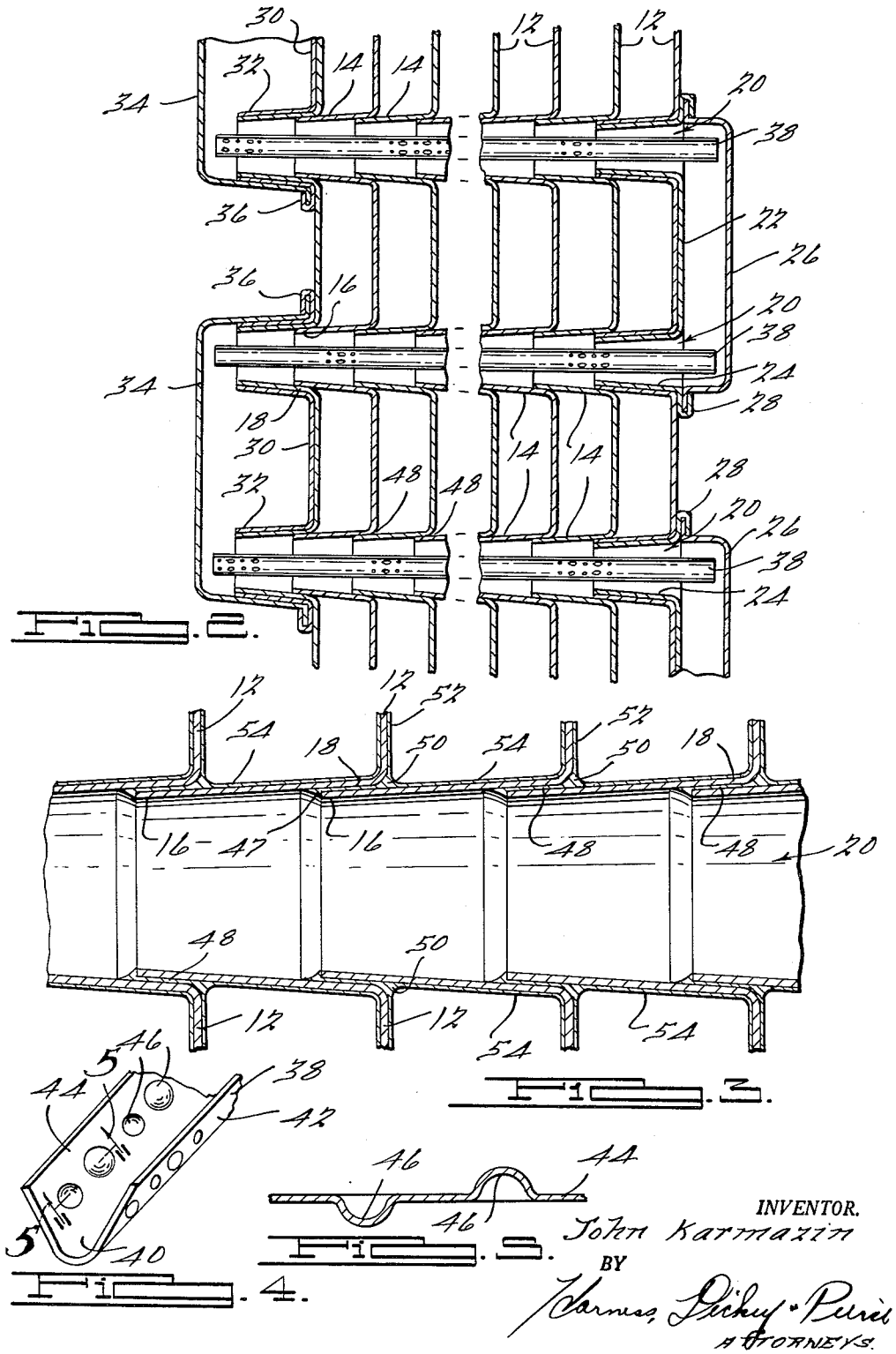
INVENTOR.
John Karmazin United States Patent Office 3,209,440
Patented Oct. 5, 1965

3,209,440
METHOD OF BONDING HEAT EXCHANGER HAVING NESTED CONDUIT SECTIONS
John Karmazin, Karmazin Products Corporation, Wyandotte, Mich.
Filed May 1, 1961, Ser. No. 106,672
3 Claims. (Cl. 29—157.3)

This invention relates to heat exchangers and particularly to heat exchangers of the type comprised of nested conduit sections having heat radiating fins.

It is an object of the present invention to provide a method for manufacturing heat exchangers wherein the solder and flux which are used to bond the parts of the unit together are applied to the parts in an improved, convenient and easily handled manner.

It is another object of the present invention to provide a method of the above character which assures an adequate supply of flux to effect complete bonding of the parts, but without wasting flux through the use of excessive quantities thereof.

It is still another object of the present invention to provide a method of the above character which assures the complete melting of the solder, the intermingling of the solder and flux, and the maintenance of the flux in localized areas in which it is less likely to be completely dissipated prior to the melting of the solder.

It is still another object of the present invention to provide a method of the above character which produces an improved and more complete bond between the several parts of the heat exchanger to be joined.

It is a further object of the present invention to provide a method for manufacturing a heat exchanger which strengthens the heat radiating fins against distortion and which results in the application of a protective coating to the exterior of the heat exchanger.

It is still another object of the present invention to provide an inexpensive and convenient method for manufacturing strong, long-lived heat exchangers having a high rate of thermal conductivity.

These and other objects of the present invention will become apparent from the following detailed description taken in conjunction with the accompanying drawings wherein:

FIG. 2 is an enlarged fragmentary vertical sectional view of the structure illustrated in FIGURE 1 illustrating the placement of bonding material prior to the melting of the bonding material;

FIG. 3 is a greatly enlarged fragmentary view of the structure illustrated in FIGURE 1, upon the completion of the bonding operation;

FIG. 4 is a fragmentary perspective view of a length of the bonding material illustrated in FIG. 2;

FIG. 5 is a sectional view of the structure illustrated in FIG. 4, taken along the lines 5—5 thereof;

FIGURE 1 illustrates a heat exchanger core comprised of a plurality of conduits or tubes which are interconnected at their ends to form a continuous path for the flow of fluid through the core. The tubes have integrally formed heat dissipating fins projecting laterally therefrom to provide a large amount of surface area in contact with air or other fluid medium in which the unit is located.

Figure 1:
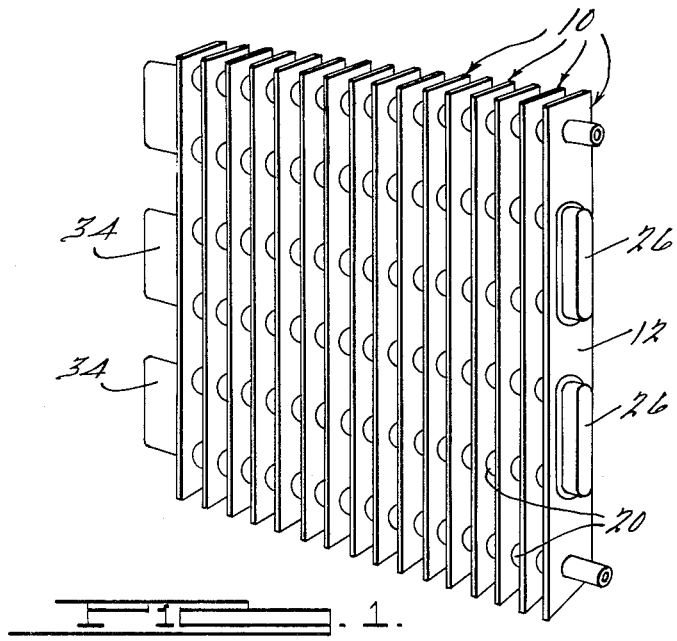
FIGURE 1 is a perspective view of a heat exchanger core.

The entire core is built up from a plurality of identical sheet metal panels 10, each of which has a flat planar fin portion 12 and a number of integral tube portions or conduit sections 14 spaced apart along the length of the panel. The tube portions 14 may be produced in the panels by die forming and punching operations. The panels 10 are stacked with the fin portions 12 thereof arranged parallel to one another and with the tube portions 14 disposed in nested relationship with corresponding tube portions of the panels on either side thereof. The tube portions 14 are preferably of frusto-conical shape, although other shapes may also be used. The extremity 16 of each tube portion 14 is projected into the base 18 of the next adjacent tube portion, whereby a plurality of straight parallel conduits 20 are formed, each comprised of a series of aligned and interfitted tube portions 14 of the panels 10. In normal practice, the conduits 20 are interconnected at their adjacent ends by header structures, which provide a sealed path for the flow of fluid from one conduit 20 to the next.

In the structure illustrated in FIG. 2, the headers formed on the right-hand side of the heat exchanger include stamped sheet metal members 22 from which cones or projections 24 have been formed and the edge of which has been flanged around a cup 26, as indicated at 28. At the left-hand side of the core, the headers are formed from stampings 30 in which the cones or projections 32 are directed inwardly into the header, instead of outwardly. The edges of the stampings 30 are bent around the edge of a cup 34, as indicated at 36. It will, of course, be appreciated that the particular connections between the conduits 20 form no part of the present invention.

For the purpose of forming the conduits 20 into rigid structures which are fully sealed against the escape of fluid even under high pressure conditions, the joint formed between the extremity 16 of each tube and the base 18 of the tube portion 14 within which it is disposed, is filled with a bonding material, which bonds the tube sections together at said locations. In the manufacture of heat exchangers comprised of panels of steel, it has been customary to lay round rods of copper or other brazing material within the conduits 20 and, thereafter, to place the entire heat exchanger core with a brazing furnace to melt the copper rods and to cause the copper to flow into the joints by capillary action. The present invention, however, is particularly directed toward heat exchangers formed from copper, aluminum or other metals in which a flux must be used coincidentally with the solder or other bonding metal to clean and wet the surface to be bonded. The method of the present invention provides a means for applying the flux in a convenient and controlled manner and, additionally, results in the production of a high strength, effectively sealed, corrosion-resistant unit.

As indicated in FIG. 2, a length of bonding material 38 is placed in each one of the conduits 20 prior to the assembly of the headers on one side of the unit. While the bonding material 38 may be acquired initially in the form of a rod of circular cross section, such material is deformed to a non-circular cross-sectional shape as, for example, the shape indicated in detail in FIGS. 4 and 5. The bonding material indicated in FIGS. 4 and 5 is of a channel shape or V-shaped cross section, which forms a recess 40 between the oppositely disposed walls 42 and 44 of the strip. Additionally, oppositely facing recesses in the forms of hemispherically shaped indentations 46 are spaced linearly along the side walls 42 and 44.

While varying bonding materials may be utilized, excellent results in the production of aluminum heat exchangers have been obtained by the use of Alcoa No. 805 solder, which consists of 95 percent high purity zinc and 5 percent aluminum. Similarly, a variety of flux materials may be used, although satisfactory results in the bonding of aluminum heat exchangers with a zinc solder have been obtained by the use of Alcoa No. 66 flux, which is a zinc chloride reaction-type flux. The flux is normally obtained in the form of a dry powder. According to the present invention, however, this powder is mixed with a liquid as, for example, normal-propyl alcohol, in order to form a relatively heavy slurry. This slurry is applied directly to the length of bonding material. This may be accomplished by either dipping the bonding material directly in a large container of the flux-alcohol slurry or by applying the slurry to the flux with a suitable applicator. In either case, the slurry, which has a pasty or somewhat tacky consistency, possesses sufficient surface tension and/ or adhesion to cling in the recesses formed by the indentations 46. If desired, the flux may also be placed in the recess 40. A flux coated strip 38 is inserted into each conduit 20 and a relatively accurately controlled supply of flux is thus provided in intimate relationship with the solder, assuring that the flux will be available when needed and in a sufficient quantity to provide a complete bond between the tube sections 14. The distortion of the strip to the particular shape disclosed in the formation of the recesses provides a substantially increased surface area for the strip, so that it will more readily absorb heat in the furnace and will melt faster. Additionally the particular channel shape disclosed renders the strip relatively rigid, so that it is easily handled.

In the preferred form of the invention, a quantity of flux and bonding material is also applied to the exterior of the heat exchanger core. For this purpose, solder or other bonding material in the form of a dry powder is mixed together with a quantity of the alcohol-flux slurry. The alcohol or other liquid used forms a carrier for the solder, which is held in suspension therein. This mixture is preferably applied to the exterior of the tube sections 14 and the fins 12 by spraying. The pasty and somewhat adhesive character of the slurry provides sufficient surface tension to hold the mixture onto the core without it running off. The flux-liquid mixture for the exterior of the unit may be made somewhat more fluid than that which is used on the strips of solder within the conduits 20, in order to render the mixture easier to apply by spraying. If a relatively large amount of alcohol or other volatile carrier is used, it may be necessary to permit some of the liquid to evaporate before putting the structure in the oven, to prevent explosion of the volatile fumes given off in the furnace.

The bonding operation is accomplished by placing the heat exchanger core in an oven or furnace with the conduits formed by the tube portions 14 disposed in a horizontal attitude, where the entire structure is subjected to a temperature sufficient to melt the solder and this operation is preferably accomplished in an oxygen-free atmosphere within the furnace. In the bonding of aluminum with zinc, the temperatures are desirably between 800° F. and 850° F. In the bonding of copper, the desired temperature is substantially less, as, for example, about 500° F. In the bonding of copper, however, the soft solders, such as containing lead and tin, may desirably be used. As the heat of the oven is absorbed by the heat exchanger core, the solder is gradually melted. Similarly, the alcohol is driven off from the flux and burned. The flux will eventually react with the aluminum surfaces to produce free molten zinc, which alloys with the aluminum and provides a surface readily wetted by the solder. In the use of the particular flux mentioned above, dense fumes containing aluminum chloride are given off in the flux reaction, which must be disposed of in accordance with normal safety precautions. Because of the concentration of flux, the flux will be less rapidly dissipated than is usual in previous methods. Similarly, the increased surface area of the solder assures more rapid melting of the solder. As the solder strips 38 melt, the molten zinc will flow by capillary atraction into the joints between the nested tube portions 14, as indicated at 48. A sufficient excess amount of zinc will remain to coat a portion of the inside diameter of the conduits 20, particularly the portions adjacent the tube portion joints. This also produces annular accumulations or fillets of collected solder adjacent the tube extremities, as indicated at 47. On the outside of the heat exchanger core, a similar action will take place and powdered solder, as it melts, will attempt to flow into the joint between the nested tube portions, which action will form accumulations or fillets of solder, as indicated at 50 in FIG. 3. The fillets 50 not only help to seal the tube joints but considerably strengthen the fins against deflection. Additionally, a coating 52 of zinc will be left along the fins 12 adjacent the tube portions and will also form a coating 54 around the tube portions. The zinc coatings 52 and 54, as well as the fillets 50, considerably strengthen the fins 12 against flexure. The zinc possesses a greater tensile strength than aluminum and, even though the total thickness of the zinc coating 52 on either ide of the fin 12 is substantially less than the thickness of the fin 12, the strength of the fin 12 is substantially improved. In the sectional view of FIG. 3, the thickness of the zinc joint 48 and of the coating 52 has been substantially exaggerated over its actual thickness for the purpose of clarity of illustration. In practice, the bonding material 48 within the tube joints is of only capillary thickness and the total thickness of the bonding material coating on the fins 12 may be no more than one-tenth the thickness of the aluminum or other base material of the fin.

It has also been discovered that the effect of the zinc coatings 52 and 54 upon the heat dissipating capacity of the unit is negligible and the effectiveness of the high thermal conductivity of the aluminum is not lost. Additionally, the zinc coating provides a corrosion-resistant protective coating for the aluminum, which may, if desired, eliminate the necessity of painting the core or otherwise applying any protective coating to the core.

Figure 6:
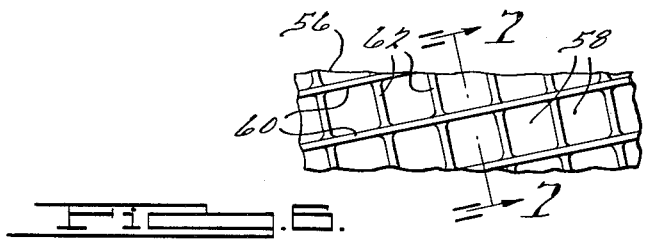
FIG. 6 is a fragmentary plan view of an alternative form of bonding material.
Figure 7:
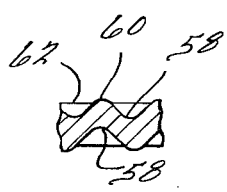
FIG. 7 is a sectional view of the structure illustrated in FIG. 6, taken along the line 7—7 thereof.

An alternative form of solder for insertion within the conduits 20 is illustrated in FIGS. 6 and 7, in which a strip of solder 56 is formed to a somewhat flat cross-sectional shape of greater width than height and in which a plurality of pockets or indentations 58 are formed on the upper and lower surfaces thereof which are separated by oppositely disposed rows of ridges 60 and 62, which are diagonally arranged with respect to the length of the strip 56. The pockets and ridges may be conveniently formed by passing the strip between a pair of deforming rollers. The flux is, of course, applied to the strip so as to be entrapped in the recesses 58 prior to the insertion of the strip within a conduit 20.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. The method of making a heat exchanger having a plurality of nested conduit sections which includes forming a length of solder to provide recess means therein, applying a flux to said length of solder to cause said flux to be deposited within said recess means, inserting said length of said flux-bearing solder into said nested conduit sections, applying a mixture of powdered solder, flux and a liquid carrier to the exterior of said conduit sections and fins, and applying heat to said nested conduit sections while said conduit sections are in a generally horizontal attitude to melt the solder both within and without the conduit sections and cause the same to flow to the joints between said conduit sections to seal said conduit sections together.

2. The method of making a heat exchanger having a plurality of nested conduit sections which includes forming a length of solder to provide recess means therein, applying a flux to said length of solder to cause said flux to be deposited within said recess means, inserting said length of said flux-bearing solder into said nested conduit sections, spraying a mixture of powdered solder, flux and a liquid carrier to the exterior of said conduit sections, and applying heat to said nested conduit sections while said conduit sections are in a generally horizontal attitude to melt the solder both within and without the conduit sections and cause the same to flow to the joints between said conduit sections to seal said conduit sections together.

3. The method of manufacturing a heat exchanger having a plurality of nested conduit sections which includes inserting a length of solder having a flux applied thereto into said nested conduit sections, applying a mixture of powdered solder, flux and a liquid carrier to the exterior of said conduit sections and applying heat to the thus formed assembly while said conduit sections are in a generally horizontal attitude to melt the solder both within and without the conduit sections and to cause the same to flow into merging relation with one another in the joints between said conduit sections thereby completely sealing said conduit sections together.

References Cited by the Examiner

UNITED STATES PATENTS

| | | | |
|---|---|---|---|
| 128,809 | 7/72 | Neill | 113—110 |
| 185,339 | 12/76 | Mackey | 113—110 X |
| 684,670 | 10/01 | Boehmler | 29—496 |
| 1,997,563 | 4/35 | Karmazin | 29—153.3 X |
| 2,012,269 | 8/35 | Cornell | 257—262.13 |
| 2,146,352 | 2/39 | Rohrer | 257—262.13 |
| 2,274,550 | 2/42 | Karmazin | 29—157.3 X |
| 2,389,175 | 11/45 | Woods | 29—157.3 |
| 2,443,577 | 6/48 | Finlay | 29—157.3 |
| 2,661,525 | 12/53 | Edwards | 113—1 X |
| 2,807,074 | 9/57 | Schroeder | 29—157.3 |

FOREIGN PATENTS 562,812  9/58  Canada.

WHITMORE A. WILTZ, *Primary Examiner.*

HYLAND BIZOT, *Examiner.*